United States Patent
Tassinario et al.

(10) Patent No.: US 9,219,388 B2
(45) Date of Patent: Dec. 22, 2015

(54) SYNCHRONOUS MOTOR WITH PERMANENT MAGNETS

(75) Inventors: Giampiero Tassinario, Florence (IT); Ivan Flotats, Barcelona (ES); Francesc Cruellas, Tiana (ES)

(73) Assignee: Infranor Holding SA, Yverdon-les-Bains (CH)

( * ) Notice: Subject to any disclaimer, the term of this patent is extended or adjusted under 35 U.S.C. 154(b) by 516 days.

(21) Appl. No.: 13/327,136

(22) Filed: Dec. 15, 2011

(65) Prior Publication Data

US 2012/0153764 A1     Jun. 21, 2012

(30) Foreign Application Priority Data

Dec. 15, 2010   (EP) ..................................... 10195055

(51) Int. Cl.
H02K 1/27      (2006.01)
H02K 3/47      (2006.01)
H02K 1/16      (2006.01)
H02K 21/14     (2006.01)

(52) U.S. Cl.
CPC ................ *H02K 1/276* (2013.01); *H02K 1/165* (2013.01); *H02K 21/14* (2013.01); *H02K 1/274* (2013.01); *H02K 1/2706* (2013.01); *H02K 3/47* (2013.01); *H02K 2201/03* (2013.01)

(58) Field of Classification Search
CPC .......... H02K 2201/00; H02K 2201/03; H02K 29/08; H02K 29/06; H02K 1/27; H02K 1/2706
USPC ........... 310/216.112, 156.74, 156.75, 156.76, 310/156.77, 68 B
See application file for complete search history.

(56) References Cited

U.S. PATENT DOCUMENTS

| | | | |
|---|---|---|---|
| 2,461,296 A | | 2/1949 | Ordas |
| 2,739,253 A | * | 3/1956 | Plumb ...................... 310/156.77 |
| 4,130,769 A | * | 12/1978 | Karube ........................... 310/46 |
| 4,868,970 A | * | 9/1989 | Schultz et al. .................. 29/596 |
| 4,937,485 A | * | 6/1990 | Mihalko ........................ 310/208 |
| 6,049,153 A | * | 4/2000 | Nishiyama et al. ..... 310/216.009 |
| 6,072,262 A | * | 6/2000 | Kim .............................. 310/429 |
| 6,222,288 B1 | | 4/2001 | Izquierdo |
| 7,999,432 B2 | * | 8/2011 | Ichiyama ...................... 310/190 |
| 2002/0130580 A1 | | 9/2002 | Arai et al. |
| 2007/0001533 A1 | * | 1/2007 | Jansen et al. ............. 310/156.19 |

FOREIGN PATENT DOCUMENTS

| | | | | |
|---|---|---|---|---|
| EP | 0 945 966 B | | 8/2005 | |
| EP | 1 710 891 A | | 10/2006 | |
| EP | 2221945 | * | 8/2010 | .............. H02K 1/22 |
| EP | 2 254 221 A | | 11/2010 | |
| JP | 2010-161896 A | | 7/2010 | |

OTHER PUBLICATIONS

Search Report issued by European Patent Office for priority application EP 10 19 5055 dated Jun. 8, 2011.

* cited by examiner

*Primary Examiner* — Burton Mullins
(74) *Attorney, Agent, or Firm* — Frommer Lawrence & Haug LLP

(57) ABSTRACT

The present invention relates to synchronous motor comprising a cylindrical rotor (4) provided with permanent magnets (3) located inside a cylindrical stator provided with a winding (U, V, W), characterized in that the rotor is provided with protuberances (41) facing the said winding.

4 Claims, 2 Drawing Sheets

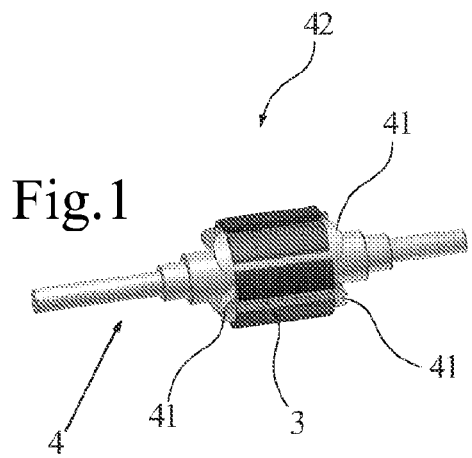
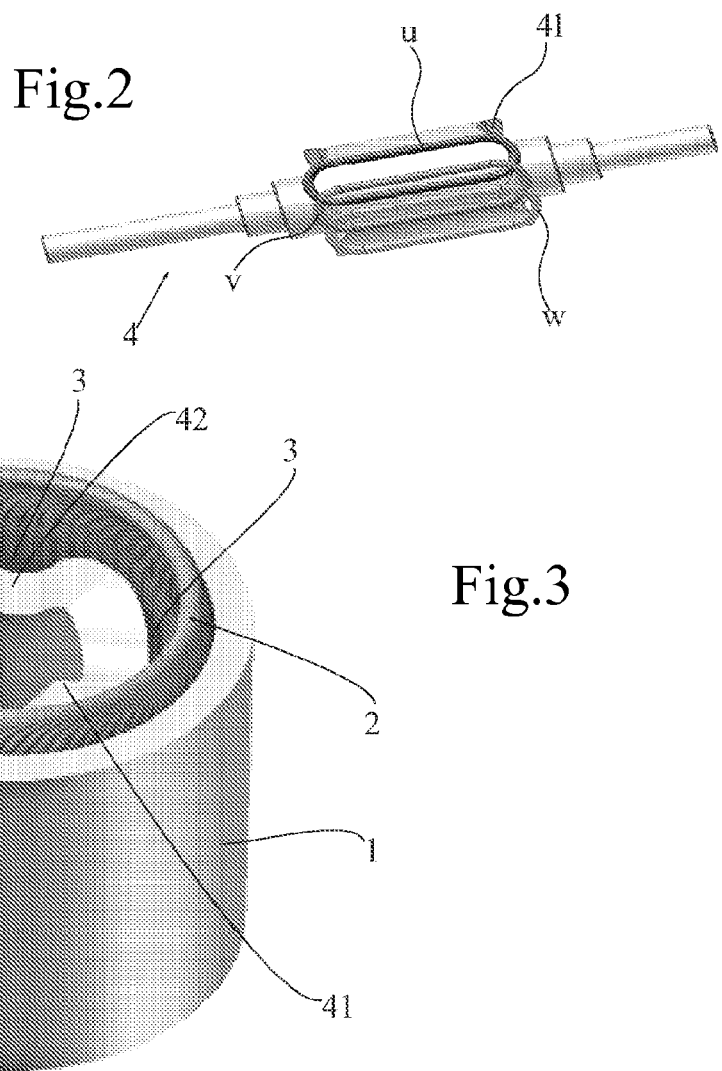

SYNCHRONOUS MOTOR WITH PERMANENT MAGNETS

This application claims priority benefits to European Patent Application Number 10195055.8 filed Dec. 15, 2010, the entire disclosure of which is incorporated herein by reference.

FIELD OF THE INVENTION

The present invention relates to a synchronous motor comprising a cylindrical rotor provided with permanent magnets located inside a cylindrical stator provided with a winding.

BACKGROUND OF THE INVENTION

The positioning of the rotor of such a synchronous motor in relation to the stator is usually controlled by an outside sensor device checking the inductance variation of the motor electrical phases.

SUMMARY OF THE INVENTION

The present invention proposes a synchronous motor in which the geometry of the rotor allows to create a magnetic sensor useful as a position feedback of the rotor and allowing to eliminate the outside sensor device and to decrease the overall length of the motor.

The synchronous motor according to the present invention comprises a cylindrical rotor comprising cylindrical rotor body made out of material having electromagnetic permeability mounted on a cylindrical rotor shaft, said cylindrical rotor body being provided with pairs of permanent magnets, said rotor being located inside a tubular stator provided with a tubular winding, wherein the permanent magnets are placed on the circumferential surface of the rotor body and wherein the two axial ends of the of the rotor body are provided with axial extending protuberances, wherein the rotor body is located over its entire length including said protuberances inside the hole of the tubular winding so the coils of the tubular winding will be sensitive to the presence or not of the rotor material close to them and sensitive to the change of the inductance value when the rotor rotates, wherein the tubular stator is a slotless stator, the number of protuberances of each end of the rotor body is equal to the number of pairs of magnets and said protuberances of each end of the rotor body are placed symmetrical about the rotation axis of the rotor body and said ends of the rotor body, provided with the protuberances, are symmetrical about a plane perpendicular to the rotation axis of the rotor body.

So the invention allows making specific rotor shape that gives positioning of the rotor without a usual external sensor control unit.

It is clear that having a stator without any slot, the reluctance of the motor will be dependent on the shape that the rotor may have.

If the stator is provided with slots, it is important that the dimensions of the slots entrances are minimized to decrease the reluctance variation.

If magnets are placed on the circumferential surface of cylindrical rotor, as the relative permeability of rare earth magnets is close to air, no reluctance variation will exist. This has an influence not only on the cogging torque (explained deeply in EP 99810212.3) but also on the values of the inductance of the winding of each phase that will remain constant. Some sensorless controls are based on the value change of the inductance of the motor as a signal to the electronic drive to inject the current in the phases of the motor. This is quite common in slotted motors but with the slotless design becomes not so obvious.

The invention and other claimed features will be described in detail in relation to the attached drawings.

BRIEF DESRIPTION OF THE DRAWINGS

FIG. 1 is a perspective view of a rotor with axial extending protuberances and permanent magnets;

FIG. 2 is the rotor of FIG. 1 without the permanent magnets with three coils each corresponding to a different electrical phase;

FIG. 3 is a perspective view of the stator the winding and the rotor body with the permanent magnets;

DETAILED DESCRIPTION OF THE INVENTION

Figure 4:
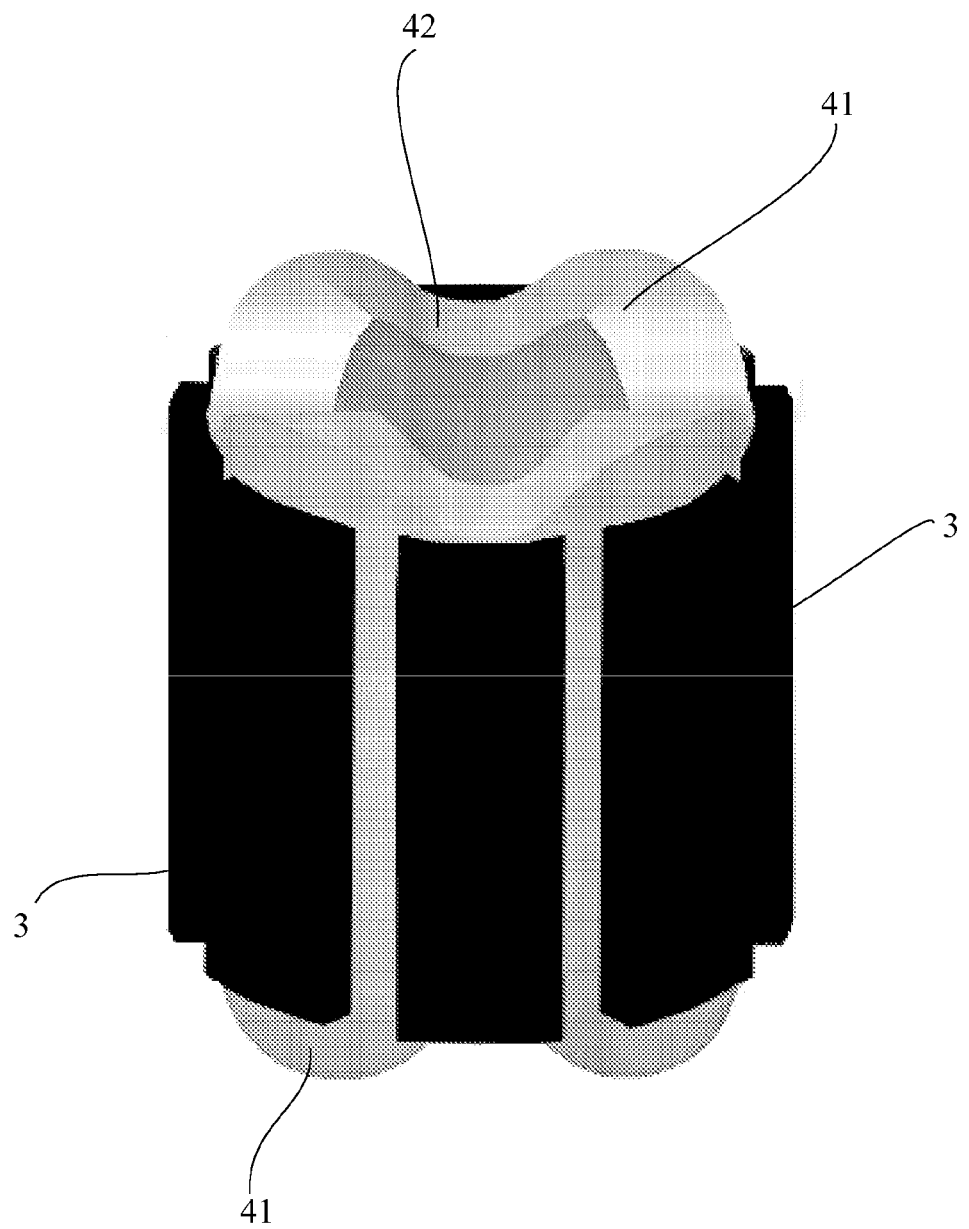
FIG. 4 is a perspective view of the rotor body with the permanent magnets.

In FIG. 1 four pairs of permanent magnets 3 are placed on the-the circumferential surface of a cylindrical rotor body 42 mounted on a rotor shaft 4. The rotor body 42 is provided at both each axial end with four axial extended protuberances 41.

In FIG. 3 are shown a tubular stator 1, a tubular winding 2, a hollow body rotor 42 (without the rotor shaft) and the permanent magnets 3 placed on the circumferential surface of the rotor body 42. Both ends of the rotor body are provided with four axial extending protuberances 41. The rotor body 42 is located over its entire length, including said protuberances 41, inside the hole of the tubular winding 3. So the coils of the winding 3 will be sensitive to the presence or not of the rotor body 42 material close to them and so, will be sensitive to the change of the inductance value when the rotor rotates. It is necessary to have the same number of protuberances 41 per end of the rotor body 42 like the number of the pairs of magnets, The protuberances 41 of each end of the rotor body 42 are placed symmetrical about the rotation axis of the rotor body and said ends of the rotor body, provided with the protuberances 41, are symmetrical about a plane perpendicular to the rotation axis of the rotor body 42 .Otherwise the influence of the protuberances will be compensated from one side versus the other. These protuberances must have an alternative shape, triangular, sinusoidal . . . . The protuberances are designed so as at a position of the rotor one phase, for example U (FIG. 2), will have the maximum value of inductance, another one, for example phase W, will have the minimum value of inductance and the third, for example phase V, will have an intermediate value of inductance.

In FIG. 4 the rotor body 42 is shown without the rotor shaft.

In all configurations the variation of the rotor material facing the winding allows to vary the value of the inductance more than 5% for each electrical phase and make possible to detect the rotor position without using a special sensor device.

What is claimed is:

1. A synchronous motor comprising a cylindrical rotor comprising cylindrical rotor body made out of material having electromagnetic permeability mounted on a cylindrical rotor shaft, said cylindrical rotor body being provided with pairs of permanent magnets, said rotor being located inside a tubular stator provided with a tubular winding, wherein the permanent magnets are placed on the circumferential surface of the rotor body and wherein the two axial ends of the of the rotor body are provided with axial extending protuberances, wherein the rotor body is located over its entire length including said protuberances inside the hole of the tubular winding+ so the coils of the tubular winding will be sensitive to the presence or not of the rotor material close to them and will be sensitive to the change of the inductance value when the rotor rotates, wherein the tubular stator is a slotless stator, the number of protuberances of each end of the rotor body is equal to the number of pairs of magnets and said protuberances of each end of the rotor body are placed symmetrical about the rotation axis of the rotor body and said ends of the rotor body, provided with the protuberances, are symmetrical about a plane perpendicular to the rotation axis of the rotor body.

2. A synchronous motor according to claim 1, wherein said protuberances are made out of different material from that of the rotor body, said protuberances are glued on the rotor body.

3. A synchronous motor according to claim 1, wherein said protuberances are made out of different material from that of the rotor and they are glued on the rotor body and wherein said material presents a higher electromagnetic permeability than that of the rotor body.

4. A synchronous motor according to claim 3, wherein said material presenting a higher electromagnetic permeability than that of the rotor body is µ-metal.

\* \* \* \* \*